Nov. 29, 1949     W. STEWART ET AL     2,489,684
FAUCET THERMOMETER
Filed Oct. 2, 1947
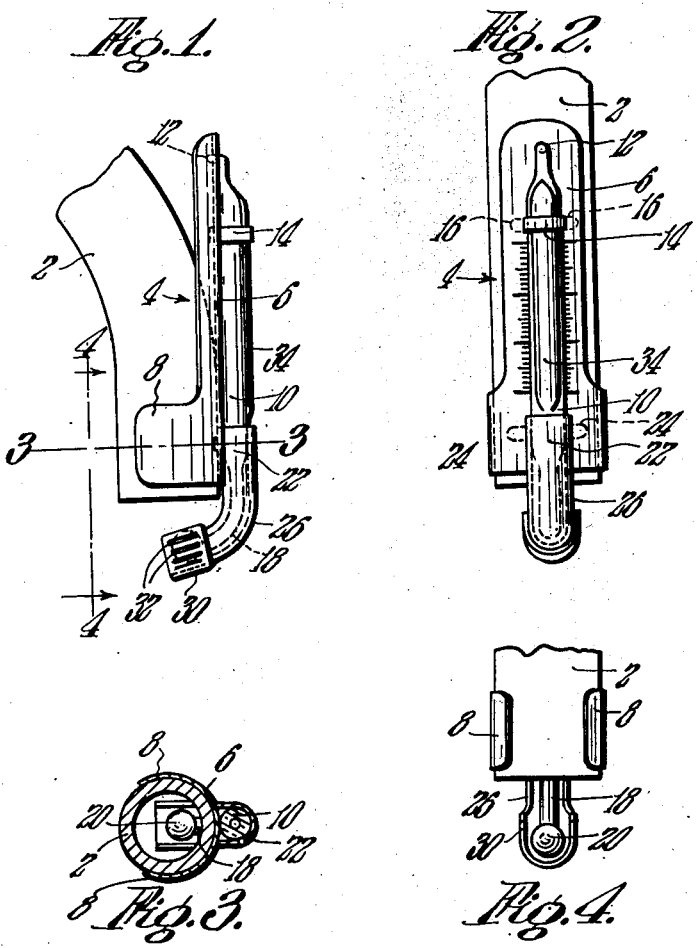
INVENTOR.
Manos Psilas and William Stewart.
BY Walter C. Ross
Attorney.

Patented Nov. 29, 1949

2,489,684

UNITED STATES PATENT OFFICE 2,489,684

FAUCET THERMOMETER

William Stewart, Indian Orchard, and Manos Psilos, Springfield, Mass.; said Stewart assignor to Myer Ellerin Application October 2, 1947, Serial No. 777,422

2 Claims. (Cl. 73—343)

This invention relates to improvements in thermometers and is directed more particularly to thermometers adapted for use with faucets and the like.

The principal object of the invention is directed to the provision of a thermometer device which is adapted for association with a faucet.

It is important in many cases to know the temperature of water being drawn from a faucet or to regulate the temperature of the water to a predetermined degree, and according to this invention a device is provided which may be releasably connected to a faucet and has a bulb which is disposed in the stream of water being discharged.

With the foregoing and various other novel features and advantages and other objects of our invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a side elevational view of the lower portion of a faucet having the thermometer device of the invention associated therewith;

Fig. 2 is a view of the faucet portion and thermometer device shown in Fig. 1;

Fig. 3 is a sectional plan view on the line 3—3 of Fig. 1; and

Fig. 4 is an elevational view on the line 4—4 of Fig. 1.

Referring now to the drawings more in detail, the invention will be fully described.

The lower portion of a faucet is shown at 2 and it will be assumed that the same is part of a faucet construction from which hot or cold water or a mixture thereof may be drawn.

A thermometer support is represented by 4 which includes a vertically disposed elongated body part 6 having inwardly curving wings 8.

The support will preferably be made from relatively thin sheet material such as plastic of which there are many and various types so that the wings will be relatively yieldable.

The main body curves transversely to approximate the faucet part 2 and the wings 8 are formed to embrace said part 2.

The wings will be relatively yieldable and function as a clip so as to snugly embrace the faucet and hold the support in place thereon.

A thermometer 10 which as usual is made from glass has an upper pin portion 12 which fits in a suitable depression or hole in the body 6.

A strap 14 embraces the upper end of the thermometer and has opposite ends 16 extending through the body which are bent outwardly rearwardly of said body.

A neck portion 18 of the thermometer curves downwardly and inwardly and carries a bulb 20 on its extremity.

A lower shield 22 is channel shape in cross section and has ears 24 which extend through the body and are bent outwardly rearwardly of said body.

An extension 26 of the shield 22 which is also channel shape in cross section follows the curvature of the neck 18 and has an outer cage portion 30 provided with openings 32, as shown.

The parts 26 and 30 are spaced from the thermometer parts 18 and 20, as shown.

The thermometer has an outer magnifying face 34 through which the column of mercury or other liquid therein is visible at an enlarged scale as is usual in thermometer construction.

Graduations are provided on the outer face of the body, as shown, and may have suitable indications as is usual.

With the device attached to a faucet as shown, the bulb 20 is disposed below the outlet of the faucet so as to be in the stream of water being drawn. The temperature of the water may be regulated so that the thermometer indicates the temperature of the water being drawn.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A thermometer device for attaching to a faucet comprising in combination, an elongated body having rearwardly and inwardly extending integral wings, said body and wings formed from relatively flexible material whereby said wings cooperate as a clip means adapted to yieldingly embrace said faucet, a thermometer on the forward face of said body, and a shield near the lower end of said body secured thereto embracing said thermometer and holding it on said body, said thermometer having a lower neck portion curving downwardly and rearwardly thereof and provided with a bulb on its extremity adapted to be disposed in a stream of water from said faucet, said shield having a lower portion curving downwardly therefrom which is channel shape in cross section, said lower neck portion of the thermometer and bulb disposed in said lower portion of the shield.

2. A thermometer device for attaching to a faucet comprising in combination, an elongated body having rearwardly and inwardly extending integral wings, said body and wings formed from relatively flexible material whereby said wings cooperate as a clip means adapted to yieldingly embrace said faucet, a thermometer on the forward face of said body, and a shield near the lower end of said body secured thereto embracing said thermometer and holding it on said body, said thermometer having a lower neck portion curving downwardly and rearwardly thereof and provided with a bulb on its extremity adapted to be disposed in a stream of water from said faucet, said shield having a lower portion curving downwardly therefrom which is channel shape in cross section, said lower neck portion of the thermometer and bulb disposed in said lower portion of the shield, and the outer end of said lower portion of the shield provided with openings therethrough.

WILLIAM STEWART.
MANOS PSILOS.

REFERENCES CITED

The following references are of record in the file of this patent:

UNITED STATES PATENTS

| Number | Name | Date |
|---|---|---|
| 2,112,648 | Brown | Mar. 29, 1938 |